(12) United States Patent
Hosogaya et al.

(10) Patent No.: US 10,602,361 B2
(45) Date of Patent: Mar. 24, 2020

(54) STORAGE DEVICE, READER WRITER, ACCESS CONTROL SYSTEM, AND ACCESS CONTROL METHOD

(71) Applicant: Sony Corporation, Tokyo (JP)

(72) Inventors: Yuto Hosogaya, Tokyo (JP); Shingo Aso, Tokyo (JP); Yuya Ishikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 15/572,878

(22) PCT Filed: Apr. 22, 2016

(86) PCT No.: PCT/JP2016/062726
§ 371 (c)(1),
(2) Date: Nov. 9, 2017

(87) PCT Pub. No.: WO2016/185868
PCT Pub. Date: Nov. 24, 2016

(65) Prior Publication Data
US 2018/0124610 A1 May 3, 2018

(30) Foreign Application Priority Data

May 18, 2015 (JP) ................................. 2015-100788

(51) Int. Cl.
*G06F 7/04* (2006.01)
*G06F 15/16* (2006.01)
(Continued)

(52) U.S. Cl.
CPC ............ *H04W 12/08* (2013.01); *G06F 3/067* (2013.01); *G06F 3/0622* (2013.01);
(Continued)

(58) Field of Classification Search
CPC .......... H04W 12/0804; H04W 12/0608; H04L 63/0853; G06F 21/35; G06F 2221/2111; G06F 3/0622
See application file for complete search history.

(56) References Cited

U.S. PATENT DOCUMENTS 5,930,467 A * 7/1999 Morita .................. G06F 3/0613
358/1.16
8,392,403 B2 * 3/2013 Yu ........................ G06F 16/2471
707/718
(Continued)

FOREIGN PATENT DOCUMENTS

JP 2000-057286 A 2/2000
JP 2001-195553 A 7/2001
(Continued)

OTHER PUBLICATIONS

"Qawi Harward, R. Jacob Baker, RobertDrost, Main Memory with Proximity Communication: A Wide I/O DRAM Architecture, Apr. 16, 2010, IEEE Xplore, INSPEC#1121575" (Year: 2010).*
(Continued)

*Primary Examiner* — Phy Anh T Vu
(74) *Attorney, Agent, or Firm* — Michael Best & Friedrich LLP

(57) ABSTRACT

A storage device of the disclosure includes: a storage section that stores data; a communication section that performs wireless communication with one or a plurality of electronic apparatuses; an interface section that performs exchange of the data with a host apparatus; and a control section that determines a distance to each of the electronic apparatuses through the wireless communication, and controls access to the storage section by the host apparatus, on the basis of the distance and whether the host apparatus is accessing the storage section.

20 Claims, 12 Drawing Sheets

(51) Int. Cl.
*G06F 17/30* (2006.01)
*H04L 29/06* (2006.01)
*H04W 12/08* (2009.01)
*G06F 21/40* (2013.01)
*G06F 21/35* (2013.01)
*G06F 21/78* (2013.01)
*G06F 3/06* (2006.01)
*H04W 12/06* (2009.01)

(52) U.S. Cl.
CPC ............ *G06F 3/0637* (2013.01); *G06F 21/35* (2013.01); *G06F 21/40* (2013.01); *G06F 21/78* (2013.01); *H04L 63/08* (2013.01); *H04L 63/107* (2013.01); *H04W 12/06* (2013.01); *G06F 2221/2111* (2013.01)

(56) References Cited

U.S. PATENT DOCUMENTS

| | | | | |
|---|---|---|---|---|
| 8,407,759 | B1* | 3/2013 | Sotos | H04L 69/14 370/328 |
| 8,766,707 | B1* | 7/2014 | Younger | G06F 1/3287 327/534 |
| 9,483,887 | B1* | 11/2016 | Soleimani | G07C 9/00007 |
| 10,078,861 | B1* | 9/2018 | Clare | G06Q 30/0635 |
| 2008/0244109 | A1* | 10/2008 | Lee | G06F 13/385 710/19 |
| 2011/0093958 | A1* | 4/2011 | Devictor | G06F 21/6218 726/26 |
| 2013/0027800 | A1* | 1/2013 | Park | G11B 5/012 360/31 |
| 2013/0174252 | A1* | 7/2013 | Weber | G06F 21/6218 726/20 |
| 2013/0336138 | A1* | 12/2013 | Venkatraman | G01S 19/48 370/252 |
| 2015/0131466 | A1* | 5/2015 | Razaghi | H04W 24/08 370/252 |
| 2016/0014103 | A1* | 1/2016 | Masters | G07C 9/00007 340/5.61 |
| 2018/0189295 | A1* | 7/2018 | Suzuki | G01C 21/3679 |
| 2018/0191324 | A1* | 7/2018 | Fujimoto | H03H 7/40 |

FOREIGN PATENT DOCUMENTS

| | | |
|---|---|---|
| JP | 2004-220207 A | 8/2004 |
| JP | 2007-195157 A | 8/2007 |
| JP | 2008-059450 A | 3/2008 |
| JP | 2010-186312 A | 8/2010 |
| JP | 2010-191552 A | 9/2010 |
| JP | 2013-196161 A | 9/2013 |
| WO | 02/086808 A1 | 10/2002 |

OTHER PUBLICATIONS

"IEEE Standard for High Data Rate Wireless Multi-Media Networks-Amendment 1: High-Rate Close Proximity Point-to-Point Communications, Jun. 7, 2017, IEEE Xplore, INSPEC#16931643" (Year: 2017).*

"S.V. Anastasiadis, R.G. Wickremesinghe; J.S. Chase, Lema: an active storage framework for flexible data access and management, Jul. 24-27, 2005, IEEE Xplore, INSPEC#8680375" (Year: 2005).*

* cited by examiner

[ FIG. 1 ]
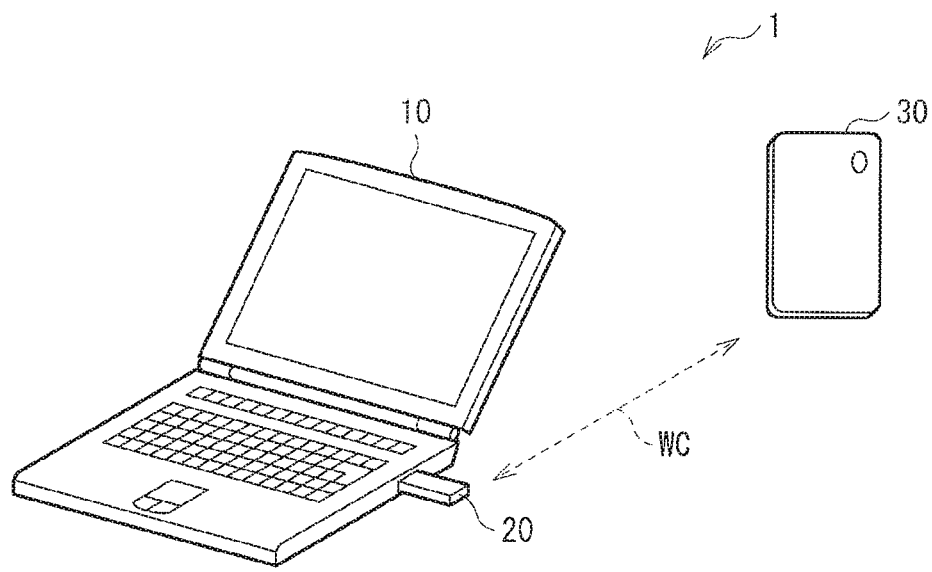
[ FIG. 2 ]
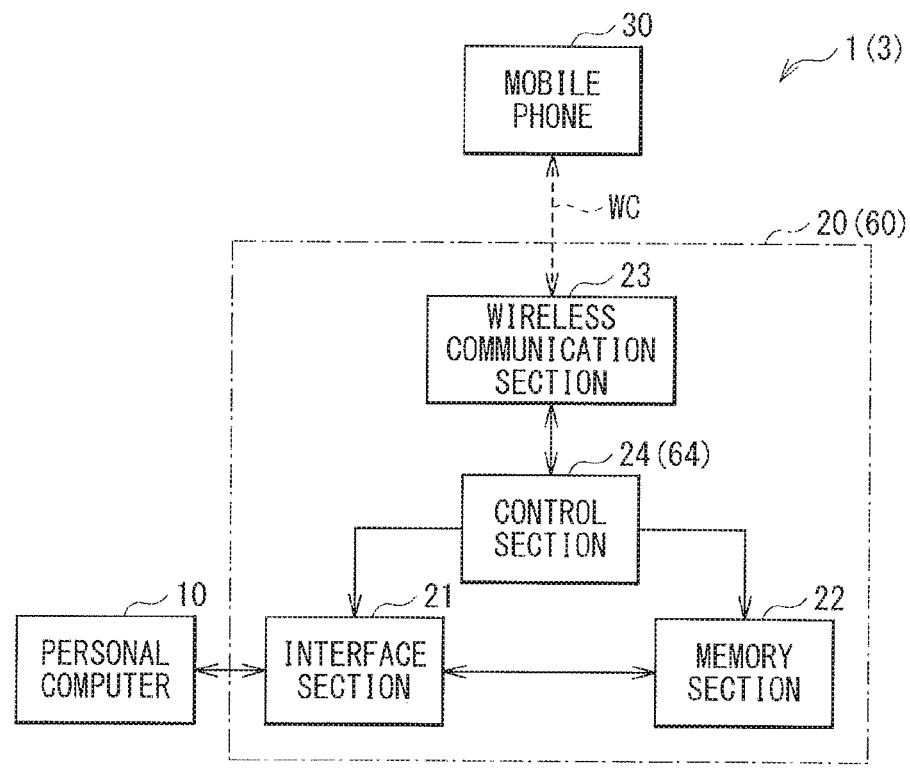

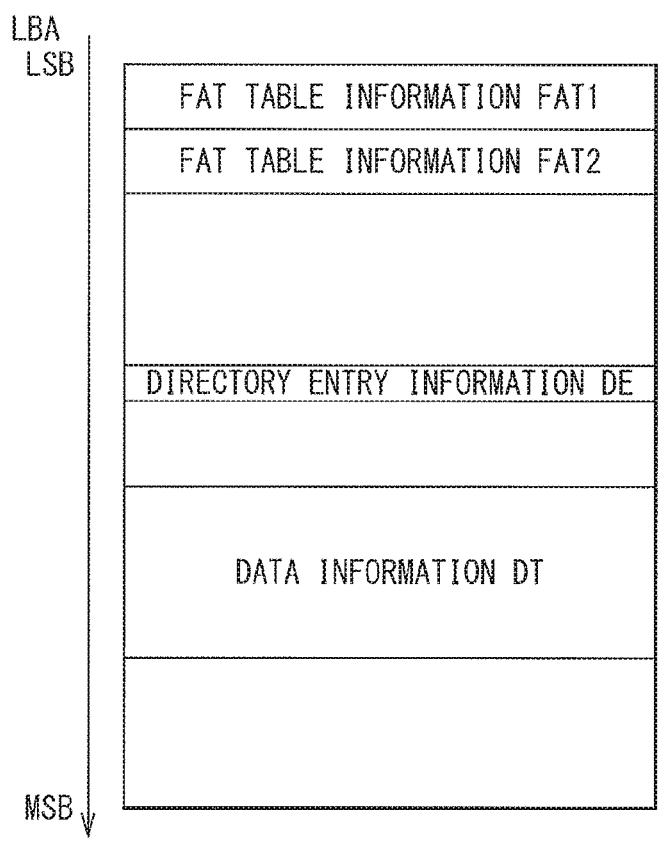
[ FIG. 3 ]

[FIG. 4]
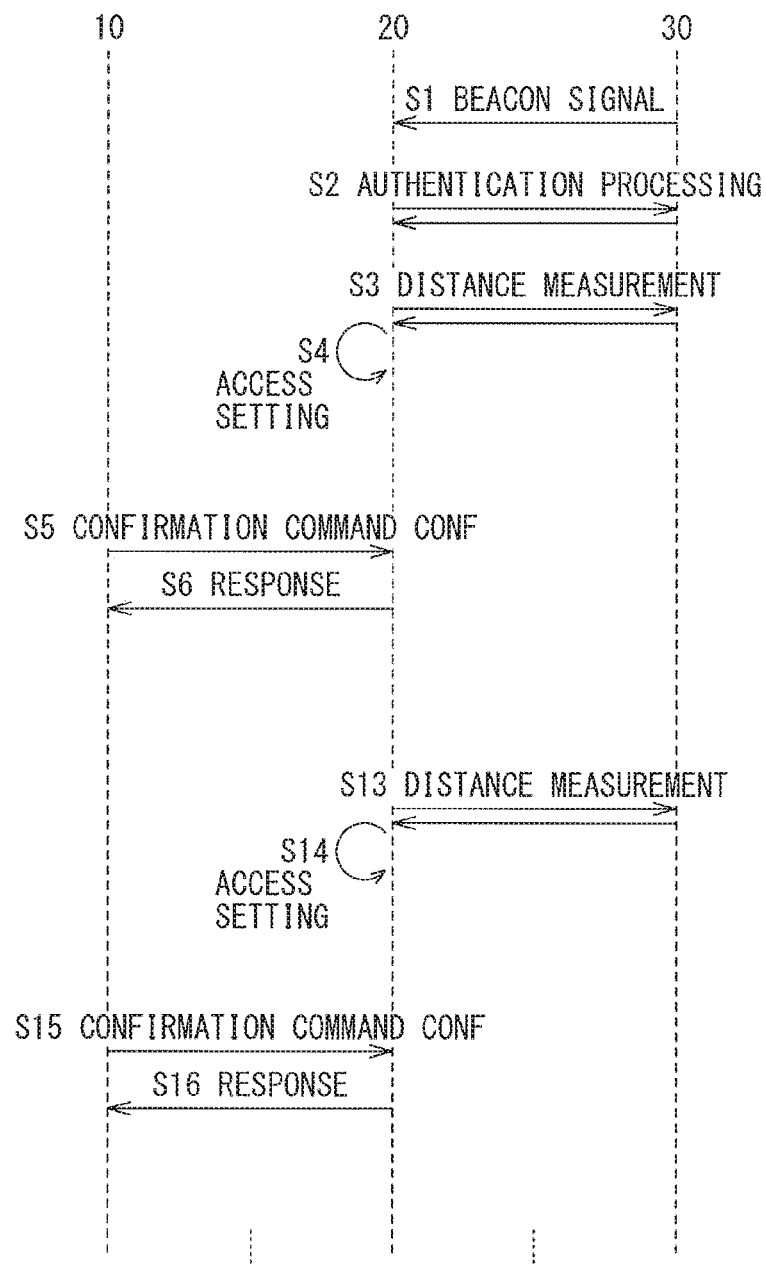

[ FIG. 5 ]
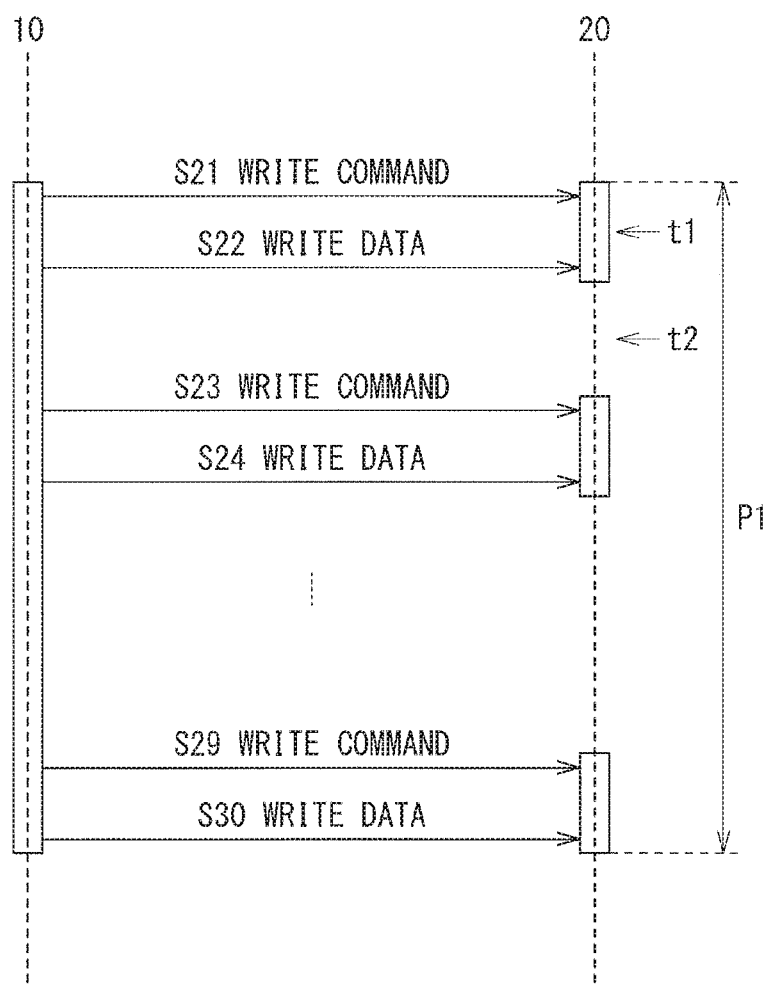

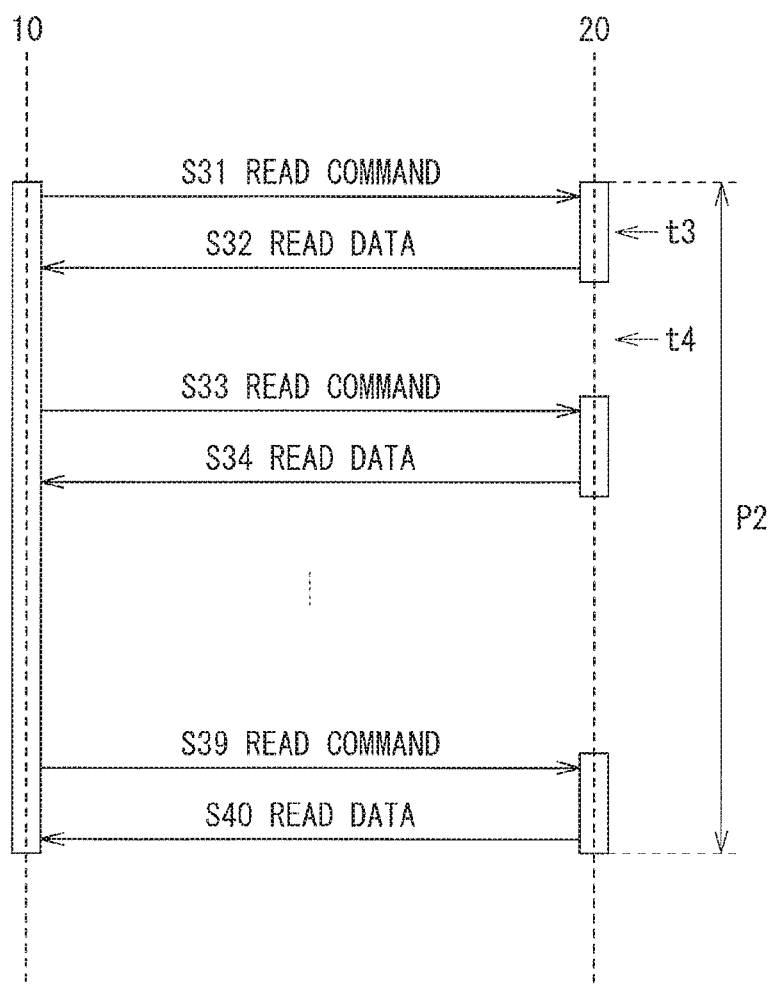
[FIG. 6]

[ FIG. 7 ]
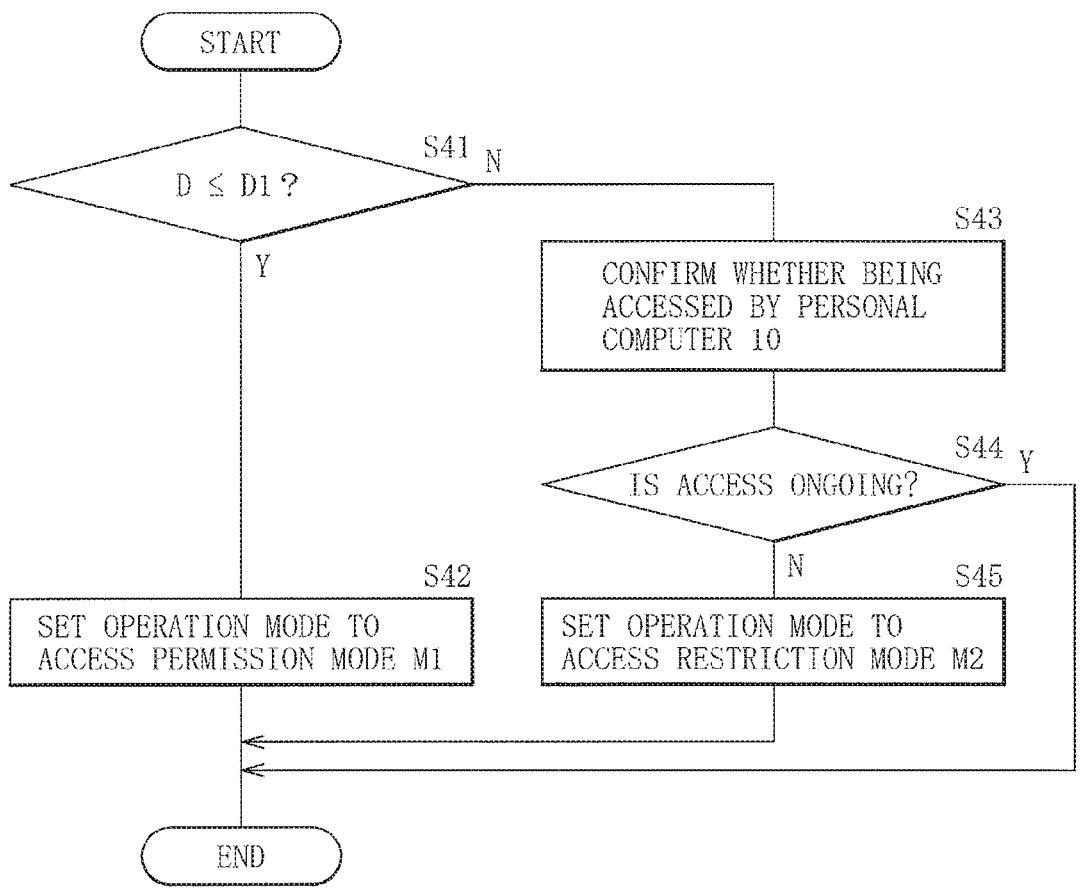
[ FIG. 8 ]
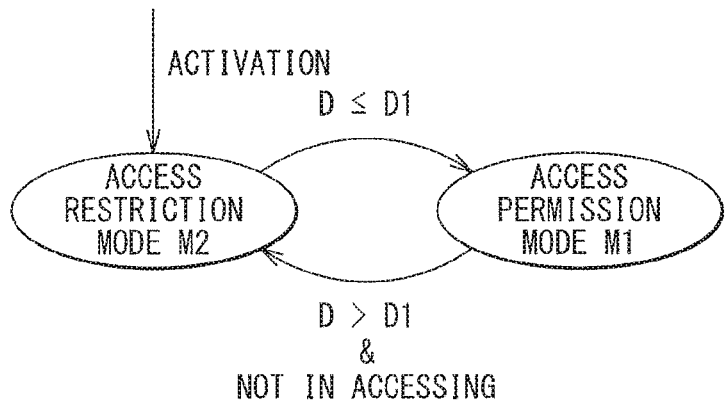

[ FIG. 9 ]
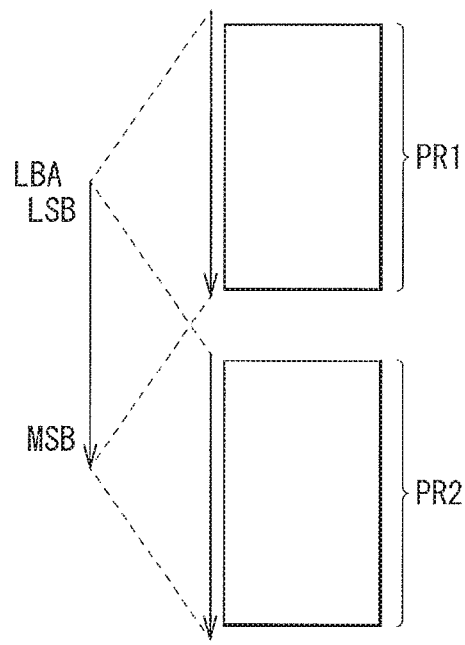
[ FIG. 10 ]
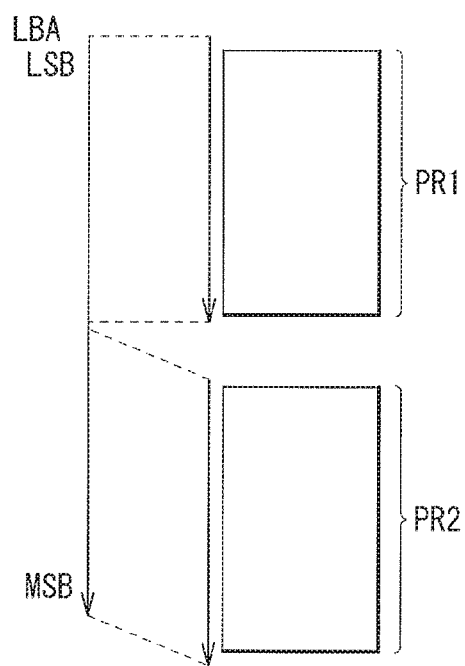

[ FIG. 11 ]
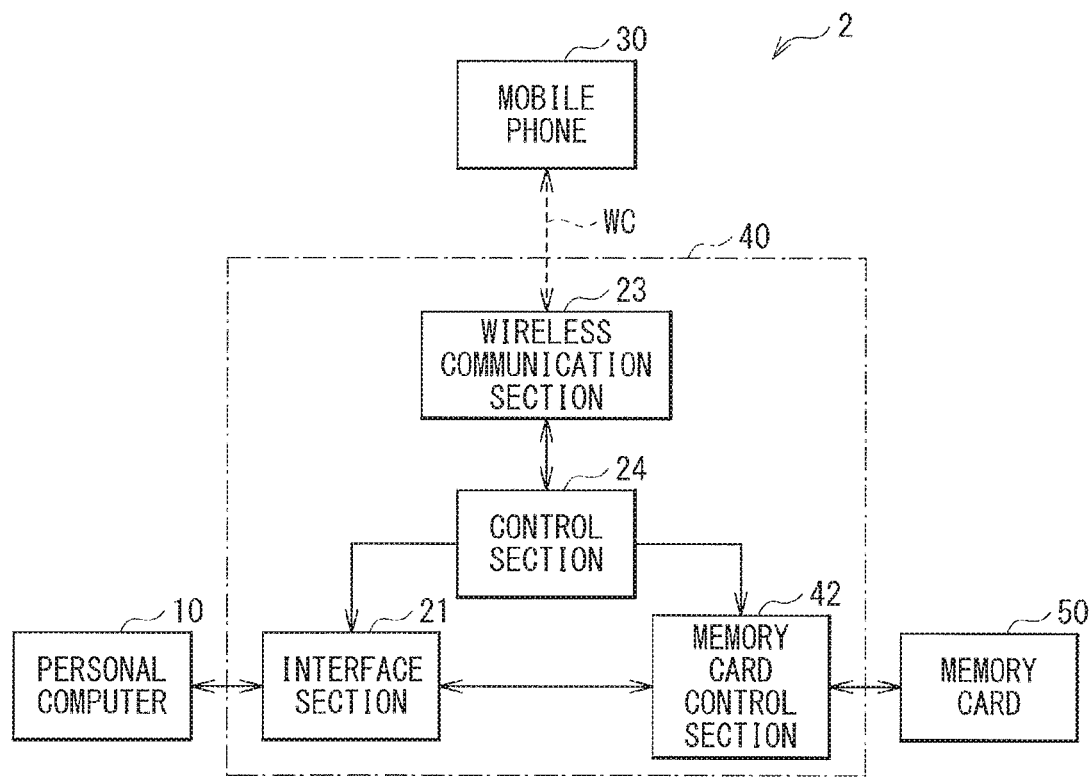
[ FIG. 12 ]
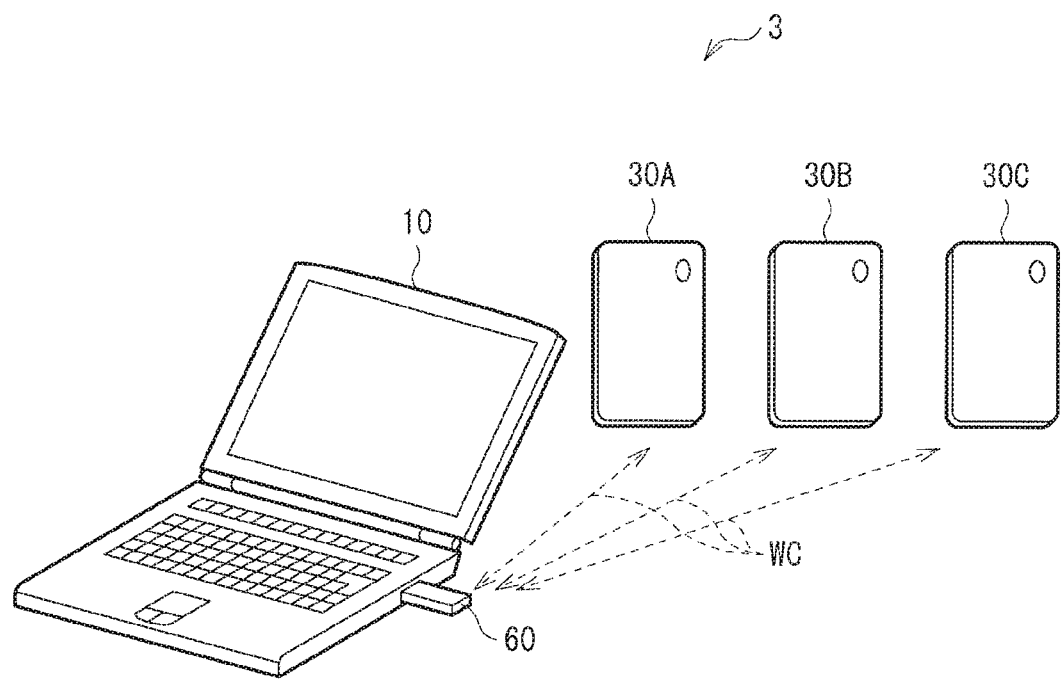

[FIG. 13]
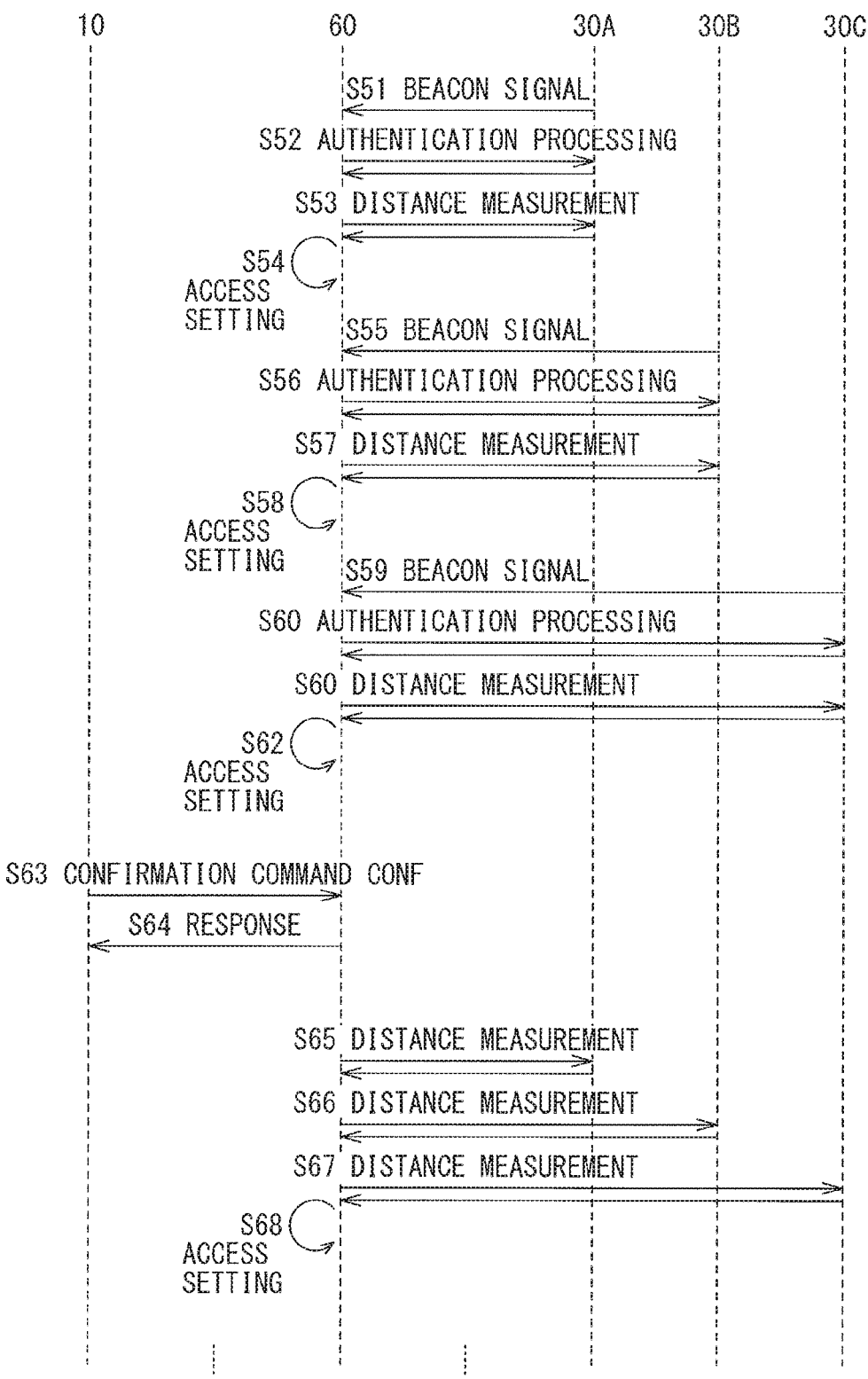

[ FIG. 14 ]
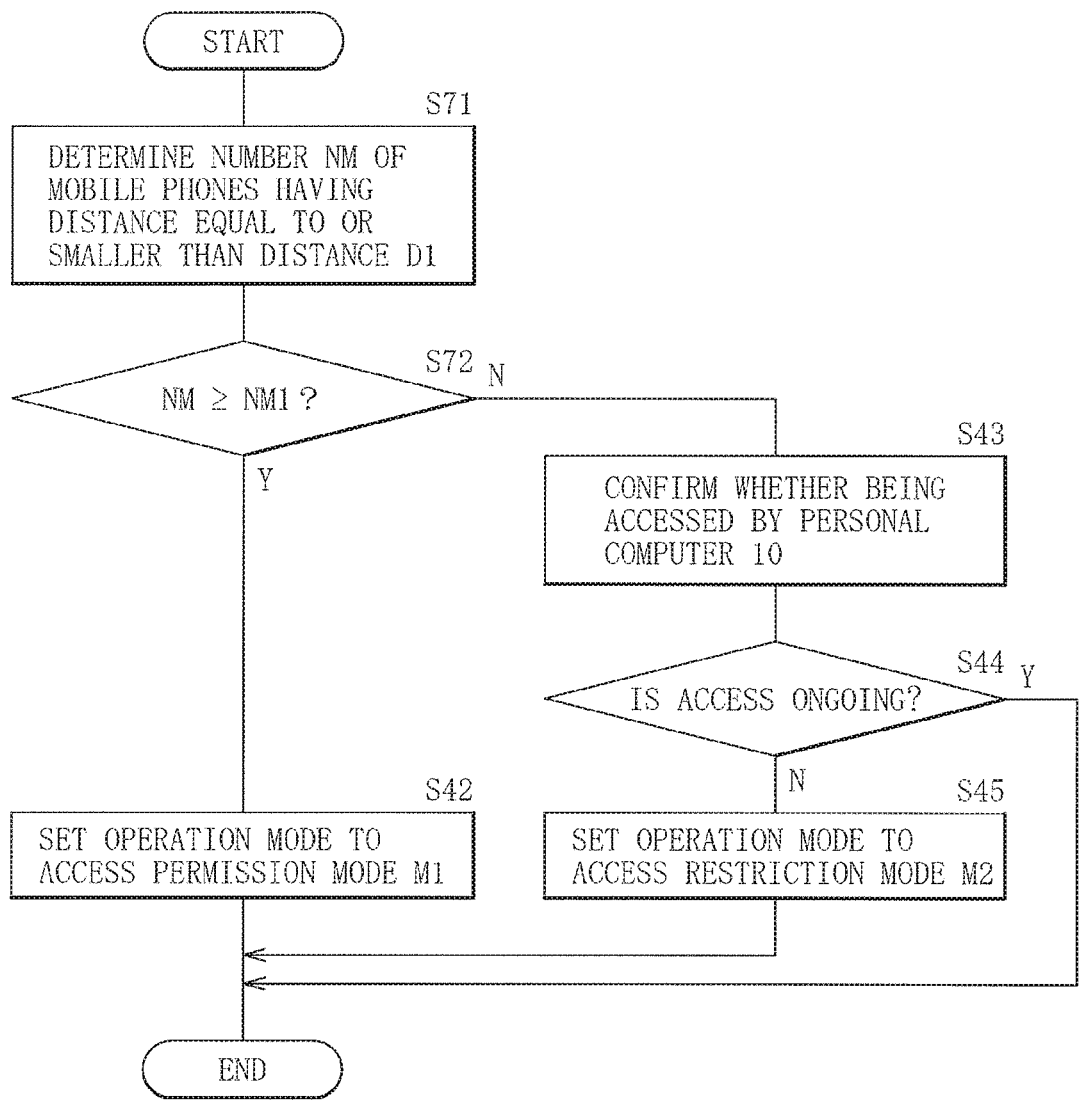

[ FIG. 15 ]
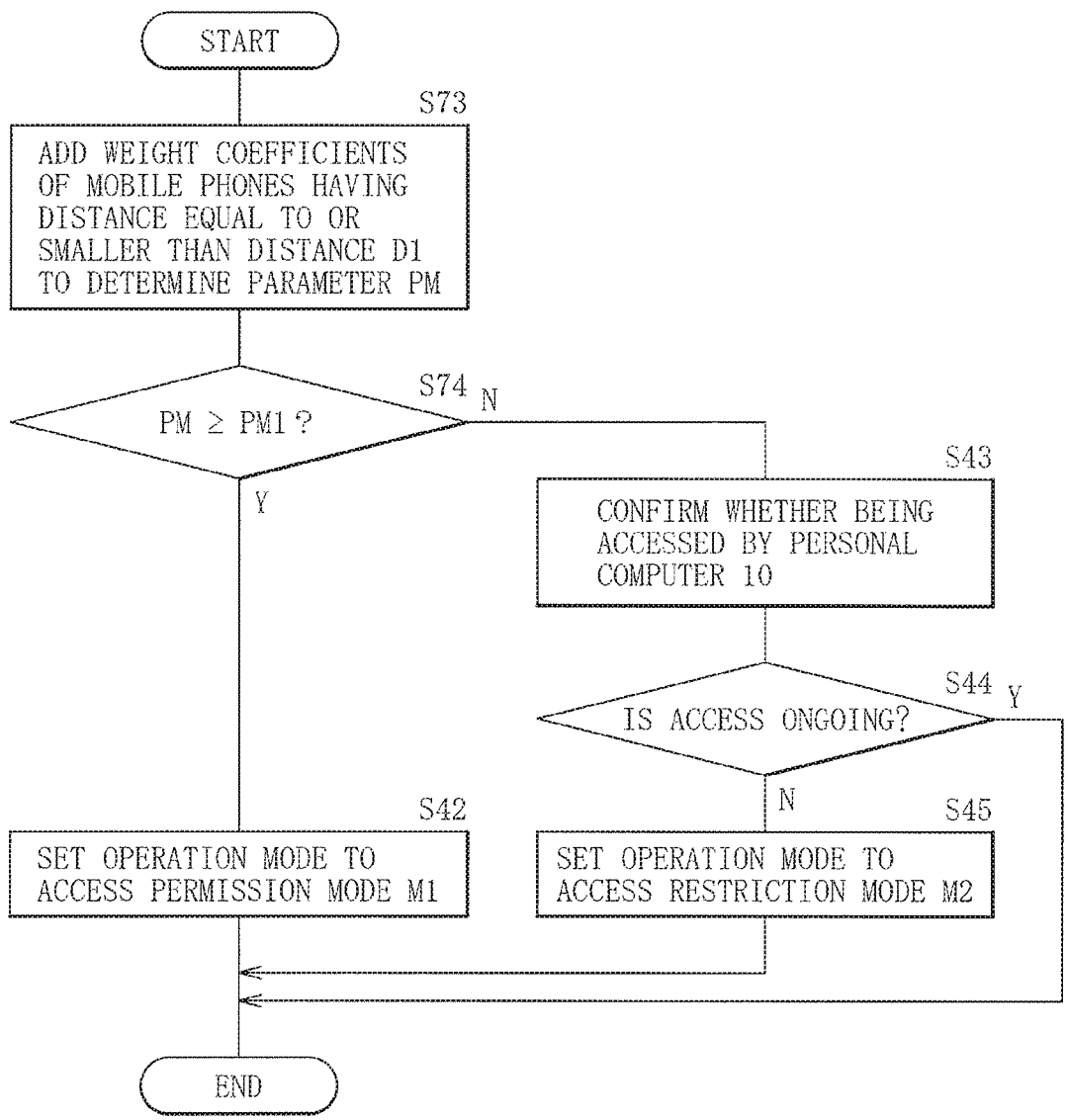

[ FIG. 16 ]
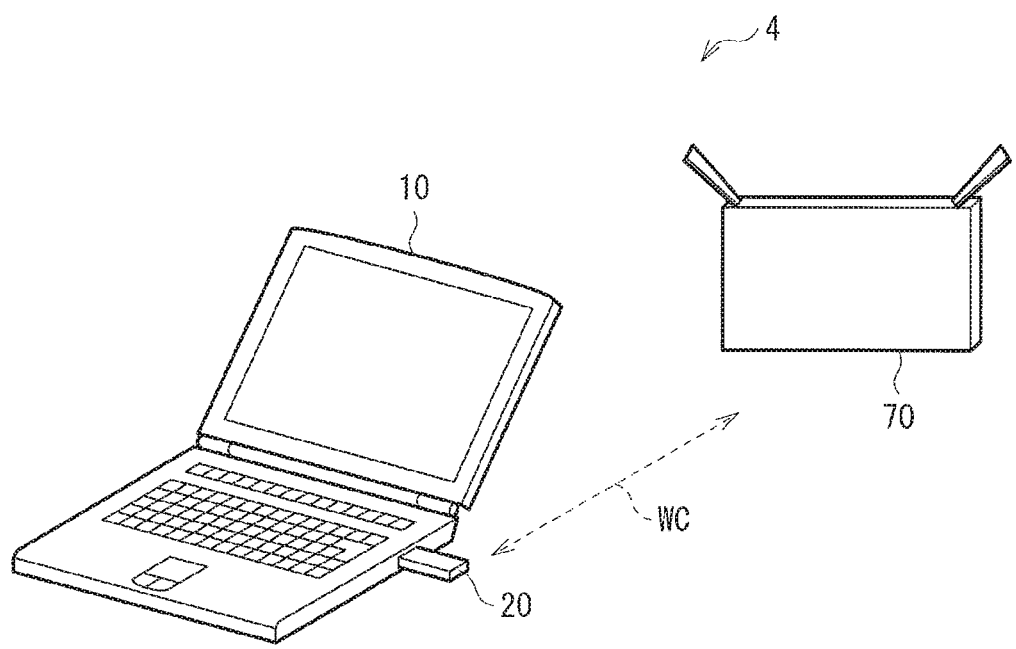

STORAGE DEVICE, READER WRITER, ACCESS CONTROL SYSTEM, AND ACCESS CONTROL METHOD

TECHNICAL FIELD

The disclosure relates to a storage device, a reader writer, an access control system including such a storage device, and an access control method for such a storage device.

BACKGROUND ART

Various data are stored in a storage device. Such data includes, for example, information to be confidential (confidential information) for persons other than some persons. Some storage devices include a function of restricting access to such confidential information. More specifically, for example, in a storage device that is configured to be able to set with a password, it is possible for only a user inputting the password to access the confidential information. In addition, PTL 1 discloses a system that restricts a function of handling confidential information stored in a memory or a hard disk of a personal computer, on the basis of, for example, a distance from the personal computer to a wireless key.

CITATION LIST

Patent Literature

PTL 1: Japanese Unexamined Patent Application Publication No. 2007-195157

SUMMARY OF INVENTION

As described above, a function of restricting access to confidential information is desired for the storage device, and in particular, restriction of access to the confidential information with enhancement in convenience of a user is expected.

It is desirable to provide a storage device, a reader writer, an access control system, and an access control method that make it possible to enhance convenience of a user.

A storage device according to an embodiment of the disclosure includes a storage section, a communication section, an interface section, and a control section. The storage section stores data. The communication section performs wireless communication with one or a plurality of electronic apparatuses. The interface section performs exchange of the data with a host apparatus. The control section determines a distance to each of the electronic apparatuses through the wireless communication, and controls access to the storage section by the host apparatus, on the basis of the distance and whether the host apparatus is accessing the storage section.

A reader writer according to an embodiment of the disclosure includes a communication section, an interface section, and a control section. The communication section performs wireless communication with one or a plurality of electronic apparatuses. The interface section performs exchange of data with a host apparatus. The control section determines a distance to each of the electronic apparatuses through the wireless communication, and controls access to a storage section by the host apparatus, on the basis of the distance and whether the host apparatus is accessing the storage section. The storage section stores the data.

An access control system according to an embodiment of the disclosure includes one or a plurality of electronic apparatuses, a host apparatus, and a storage device. The storage device includes a storage section, a communication section, an interface section, and a control section. The storage section stores data. The communication section performs wireless communication with the one or the plurality of electronic apparatuses. The interface section performs exchange of the data with the host apparatus. The control section determines a distance to each of the electronic apparatuses through the wireless communication, and controls access to the storage section by the host apparatus, on the basis of the distance and whether the host apparatus is accessing the storage section.

An access control method according to an embodiment of the disclosure includes: performing wireless communication with one or a plurality of electronic apparatuses to thereby determine a distance to each of the electronic apparatuses; and controlling access to a storage section by a host apparatus, on the basis of the distance and whether the host apparatus is accessing the storage section.

In the storage device, the reader writer, the access control system, and the access control method according to the respective embodiments of the disclosure, the wireless communication is performed with the one or the plurality of electronic apparatuses and the exchange of the data with the host apparatus is performed. At this time, the access to the storage section by the host apparatus is controlled, on the basis of the distance to each of the electronic apparatuses and whether the host apparatus is accessing the storage section.

According to the storage device, the reader writer, the access control system, and the access control method according to the respective embodiments of the disclosure, the access to the storage section by the host apparatus is controlled, on the basis of the distance to each of the electronic apparatuses and whether the host apparatus is accessing the storage section. This makes it possible to enhance convenience of a user. Note that effects described here are non-limiting. Any of effects described in the present disclosure may be provided.

BRIEF DESCRIPTION OF DRAWINGS

FIG. 1 is an explanatory diagram illustrating a configuration example of an access control system according to an embodiment of the disclosure.

FIG. 2 is a block diagram illustrating a configuration example of a storage device illustrated in FIG. 1.

FIG. 3 is an explanatory diagram illustrating an address space in a storage section illustrated in FIG. 2.

FIG. 4 is a sequence diagram illustrating an operation example of the access control system illustrated in FIG. 1.

FIG. 5 is a sequence diagram illustrating an example of write access in the access control system illustrated in FIG. 1.

FIG. 6 is a sequence diagram illustrating an example of read access in the access control system illustrated in FIG. 1.

FIG. 7 is a flowchart illustrating an operation example of the storage device illustrated in FIG. 1.

FIG. 8 is a state transition diagram illustrating the operation example of the storage device illustrated in FIG. 1.

FIG. 9 is an explanatory diagram illustrating an operation example of a storage device according to a modification example.

FIG. 10 is an explanatory diagram illustrating an operation example of a storage device according to another modification example.

FIG. 11 is a block diagram illustrating a configuration example of an access control system according to another modification example.

FIG. 12 is an explanatory diagram illustrating a configuration example of an access control system according to another modification example.

FIG. 13 is a sequence diagram illustrating an operation example of the access control system illustrated in FIG. 12.

FIG. 14 is a flowchart illustrating an operation example of a storage device illustrated in FIG. 12.

FIG. 15 is a flowchart illustrating an operation example of a storage device according to another modification example.

FIG. 16 is an explanatory diagram illustrating a configuration example of an access control system according to another modification example.

MODES FOR CARRYING OUT THE INVENTION

Embodiments of the disclosure are described in detail below with reference to drawings.
[Configuration Example]

FIG. 1 illustrates a configuration example of an access control system (an access control system 1) according to an embodiment. The access control system 1 is configured in such a manner that a storage device itself is able to restrict access from other apparatuses. Note that the access control system and an access control method according to respective embodiments of the disclosure are implemented by the present embodiment, and are accordingly described together. The access control system 1 includes a personal computer 10, a storage device 20, and a mobile phone 30.

The personal computer 10 is able to write data into the storage device 20, or read data stored in the storage device 20. The personal computer 10 includes, for example, a USB (Universal Serial Bus) terminal, and the storage device 20 is coupled to the USB terminal in this example. Note that the personal computer 10 is illustrated as a laptop computer in FIG. 1; however, the personal computer 10 is not limited thereto, and may be a desktop computer.

The storage device 20 is a storage device that stores data. In this example, the storage device 20 is a so-called USB (Universal Serial Bus) memory and is a device that operates in USB Mass Storage Class. In this example, the storage device 20 is inserted into the USB terminal of the personal computer 10, and data is able to be written into or read from the storage device 20 through the personal computer 10. In addition, the storage device 20 is configured to be able to perform wireless communication WC with the mobile phone 30.

The mobile phone 30 is a multifunctional mobile phone (so-called smartphone) in this example, and for example, is carried by a user while being suspended from a neck of the user. In addition, the mobile phone 30 is configured to be able to perform the wireless communication WC with the storage device 20.

In the access control system 1, the storage device 20 performs access setting with respect to access from the computer 10 through the above-described configuration. More specifically, as described later, the storage device 20 performs the access setting on the basis of a distance D between the storage device 20 and the mobile phone 30 and whether the personal computer 10 is accessing the storage device 20.

Note that the storage device 20 is a USB memory in this example; however, the storage device 20 is not limited thereto, and for example, may be a memory stick or an SD memory card. In addition, the storage device 20 is not limited to the device attachable to and detachable from the personal computer 10 as described above, and may be a device built in the personal computer 10, such as a storage device having a SATA (Serial Advanced Technology Attachment) interface (for example, an HDD (Hard disk drive), an SSD (Solid State Drive), and an eMMC (embedded Multi Media Card)). Moreover, the storage device 20 is directly coupled to the personal computer 10 in this example; however, the coupling method is not limited thereto, and the storage device 20 may be coupled to the personal computer 10 through, for example, wireless communication.

In addition, the access control system 1 is configured with use of the personal computer 10 in this example; however, the configuration is not limited thereto, and any other apparatus may be used as long as the apparatus is coupleable to the storage device 20. More specifically, for example, a smartphone, a television receiver, or an AV (Audio Visual) component may be used.

In addition, the access control system 1 is configured with use of the mobile phone 30 in this example; however, the configuration is not limited thereto, and any other apparatus may be used as long as the apparatus is able to perform the wireless communication WC with the storage device 20. More specifically, for example, a tablet or a wireless LAN (Local Area Network) router may be used. Note that the apparatus is not limited to such a high-functional apparatus, and may be a simple module having only a function of outputting a wireless signal.

FIG. 2 illustrates a configuration example of the storage device 20. The storage device 20 includes an interface section 21, a storage section 22, a wireless communication section 23, and a control section 24.

In this example, the interface section 21 is an USB interface and is an interface for the personal computer 10. The storage device 20 performs exchange of data and a control signal (a command) with the personal computer 10 through the interface section 21.

The storage section 22 stores data, and is configured with use of, for example, an NAND flash memory. The storage section 22 stores data that is supplied from the personal computer 10 through the interface section 21, on the basis of a write instruction from the control section 24. In addition, the storage section 22 reads the stored data, on the basis of a read instruction from the control section 24, and supplies the data to the personal computer 10 through the interface section 21.

FIG. 3 illustrates an address space of the storage section 22. In this example, the address space is described by taking an FAT (File Allocation Table) file system as an example. FIG. 3 represents the address space with LBA (Logical Block Addressing), and illustrates an entire address space from LSB (Least Significant Bit) side to MSB (Most Significant bit) side. Note that the tile system of the storage section 22 is not limited to the FAT file system. Alternatively, the file system may be, for example, an EXT (extended) file system, an NTFS (NT File System), or an HFS (Hierarchical File System).

The storage section 22 stores FAT table information FAT1 and FAT2, directory entry information DE, and data information DT. The FAT table information FAT1 and FAT2 manage a usage condition for each sector (for example, each 32 [kB]) in the address space of the storage section 22. The FAT table information FAT1 and FAT2 are normally coincident with (matched with) each other. The directory entry information DE includes a file name of a file included in each directory, a date of update of the file, etc. The data information DT is a main body of the data. The data information DT includes, for example, confidential information.

The wireless communication section 23 performs the wireless communication WC with the mobile phone 30. More specifically, the wireless communication section 23 performs the wireless communication WC through Bluetooth (registered trademark) in this example. Using Bluetooth as described above makes it possible to reduce power consumption in the storage device 20 and the mobile phone 30 that performs communication with the storage device 20. Note that the communication method is not limited to Bluetooth, and alternatively, for example, wireless LAN may be used.

The control section 24 controls an operation of each block in the storage device 20. In addition, the control section 24 also includes a function of performing the access setting with respect to access from the personal computer 10. More specifically, the control section 24 is configured to be operable in two operation modes of an access permission mode M1 in which access from the personal computer 10 is permitted and an access restriction mode M2 in which access is restricted. Further, the control section 24 acquires the distance D between the storage device 20 and the mobile phone 30 through the wireless communication WC between the wireless communication section 23 and the mobile phone 30, and sets the operation mode to the access permission mode M1 or the access restriction mode M2, on the basis of the distance D. At this time, as described later, the storage device 20 sets the operation mode by taking into consideration whether the personal computer 10 is accessing the storage device 20 as well.

Here, the mobile phone 30 corresponds to a specific example of an "electronic apparatus" in the disclosure. The personal computer 10 corresponds to a specific example of a "host apparatus" in the disclosure. The wireless communication section 23 corresponds to a specific example of a "communication section" in the disclosure.

[Operation and Working]

Subsequently, an operation and a working of the access control system 1 according to the present embodiment are described.

[Operation Outline]

First, operation outline of the storage device 20 is described with reference to FIG. 2. The storage section 22 stores, on the basis of a write instruction from the control section 24, data that is supplied from the personal computer 10 through the interface section 21. In addition, the storage section 22 reads the stored data, on the basis of a read instruction from the control section 24, and supplies the data to the personal computer 10 through the interface section 21. The wireless communication section 23 performs the wireless communication WC with the mobile phone 30. The control section 24 controls an operation of each block in the storage device 20 and performs access setting with respect to access from the personal computer 10.

[Detailed Operation]

Next, an operation of the access control system 1 is described in detail.

FIG. 4 illustrates a sequence diagram of the operation in the access control system 1. The storage device 20 first authenticates the mobile phone 30, measures the distance D between the storage device 20 and the mobile phone 30, and performs the access setting, on the basis of a measurement result of the distance D. At this time, the storage device 20 sets the operation mode by taking into consideration whether the personal computer 10 is accessing the storage device 20 as well. The operation is described in detail below.

When the storage device 20 is coupled to the personal computer 10 and receives power, the storage device 20 first sets the operation mode to the access restriction mode M2.

Next, the mobile phone 30 transmits a beacon signal through the wireless communication WC, and the storage device 20 receives the beacon signal (step S1). In other words, the mobile phone 30 periodically transmits a beacon signal through the wireless communication WC, and the storage device 20 uses the beacon signal to search a surrounding mobile phone. In step S1, the storage device 20 receives the beacon signal transmitted from the mobile phone 30, thereby finding the mobile phone 30.

Next, the storage device 20 performs authentication processing on the mobile phone 30 (step S2). More specifically, the wireless communication section 23 of the storage device 20 performs the wireless communication WC with the mobile phone 30, which causes the control section 24 to confirm that the mobile phone 30 is a predetermined mobile phone (a mobile phone of a regular user) that has been determined in advance.

Next, the storage device 20 measures the distance D between the storage device 20 and the mobile phone 30 (step S3). More specifically, for example, the storage device 20 measures reception signal intensity RSSI of the signal that is transmitted from the mobile phone 30 through the wireless communication WC, thereby determining the distance D. Here, the reception signal intensity RSSI is represented by the following expression in an ideal environment without a nearby obstruction.

$$RSSI = A - 10 \cdot B \cdot \log_{10}(D)$$

Here, "A" indicates reception signal intensity at a place away from the mobile phone 30 by 1 [m], and "B" is, for example, "2" in theory. The storage device 20 determines the distance D, on the basis of the reception signal intensity RSSI by using such an expression.

Note that, in a case where the wireless communication WC corresponds to PXP (Proximity Profile) that is defined as a function of Bluetooth 4.0, an apparatus on transmitting side informs an apparatus on receiving side of transmission signal intensity. Therefore, the apparatus on the receiving side determines the distance D, on the basis of the transmission signal intensity and the reception signal intensity.

Next, the storage device 20 performs the access setting (step S4). More specifically, the control section 24 sets the operation mode to the access permission mode M1 or the access restriction mode M2, on the basis of the distance D determined in step S3. At this time, as described later, the control section 24 sets the operation mode by taking into consideration whether the personal computer 10 is accessing the storage device 20 as well.

Thereafter, the storage device 20 periodically measures the distance D between the storage device 20 and the mobile phone 30 (for example, step S13), in a manner similar to the operations in steps S3 and S4, and performs the access setting, on the basis of the distance D (for example, step S14).

On the other hand, the personal computer 10 periodically transmits, to the storage device 20, a confirmation command CONF to confirm the state of the storage device 20 (step S5). More specifically, in this example, in a case where the personal computer 10 does not perform write access and read access on the storage device 20, the personal computer 10 periodically transmits the confirmation command CONF.

Thereafter, the storage device 20 responses the confirmation command CONF, and informs the personal computer 10 of whether the operation mode is the access permission mode M1 or the access restriction mode M2 (step S6).

More specifically, in a case where the storage device 20 is, for example, an USB memory that operates in USB Mass Storage Class, a TEST_UNIT_READY command is usable as the confirmation command CONF. More specifically, the personal computer 10 transmits the TEST_UNIT_READY command to the storage device 20. The storage device 20 receives the command. The storage device 20 then returns READY in the case where the operation mode is the access permission mode M1, and returns NOT_READY in the case where the operation mode is the access restriction mode M2.

The personal computer 10 knows whether the operation mode of the storage device 20 is the access permission mode M1 or the access restriction mode M2 in such a manner. Further, in the case where the operation mode of the storage device 20 is the access permission mode M1, the personal computer 10 performs write access of data or read access of data on the storage device 20 as necessary.

FIG. 5 illustrates a sequence diagram of the write access of data. When writing data into the storage device 20, the personal computer 10 writes the data by a predetermined data amount in a plurality of times.

The personal computer 10 first transmits a write command to the storage device 20 (step S21), and then transmits write data to the storage device 20 in a continuous manner (step S22). Thereafter, the personal computer 10 repeats the operations in steps S21 and S22 a plurality of times until all of the write data is transmitted. As a result, the write data is written into the storage device 20, and the FAT table information FAT1 and FAT2 and the directory entry information DE are updated. The data is written into the storage device 20 by the predetermined data amount in a plurality of times in a write access period P1 in the above-described manner.

FIG. 6 illustrates a sequence diagram of the read access of data. The personal computer 10 first transmits a read command to the storage device 20 (step S31). Thereafter, the storage device 20 transmits read data to the personal computer 10 (step S32). Thereafter, the personal computer 10 and the storage device 20 repeat the operations in steps S31 and S32 a plurality of times until all of data is read out. In the storage device 20, the data is read out by a predetermined data amount in a plurality of times in a read access period P2 in the above-described manner.

(Access Setting)

Next, the access setting performed by the storage device 20 in steps S4, S14, and other steps in FIG. 4 is described.

FIG. 7 illustrates a flowchart of the access setting. The storage device 20 sets the operation mode, on the basis of the distance D between the storage device 20 and the mobile phone 30 and whether the personal computer 10 is accessing the storage device 20. The operation is described in detail below.

First, the control section 24 of the storage device 20 confirms whether the distance D acquired in step S3 or other step is equal to or smaller than a predetermined distance D1 (D≤D1) (step S41). In a case where the distance D is equal to or smaller than the predetermined distance D1 ("Y" in step S41), the control section 24 sets the operation mode to the access permission mode M1 (step S42). In other words, the control section 24 determines that a previously-assumed regular user such as an owner of the mobile phone 30 is using the personal computer 10 because the mobile phone 30 is located near the storage device 20, and sets the operation mode to the access permission mode M1. The flow is then terminated.

In a case where the distance D is larger than the predetermined distance D1 in step S41 ("N" in step S41), the control section 24 then confirms whether the storage device 20 is being accessed by the personal computer 10 (steps S43 and S44). In other words, the control section 24 confirms whether the storage device 20 is being accessed for writing (the write access period P1 (FIG. 5)) or is being accessed for reading (the read access period P2 (FIG. 6)).

More specifically, the control section 24 utilizes the confirmation command CONF transmitted by the personal computer 10, and is thereby able to confirm whether the storage device 20 is being accessed by the personal computer 10. In other words, as described above, in the case where not performing the write access or the read access on the storage device 20, the personal computer 10 periodically transmits the confirmation command CONF. Therefore, in a case where the interface section 21 successively receives the confirmation command CONF, for example, a predetermined times (one or a plurality of times), the control section 24 is able to determine that the storage device 20 is not being accessed.

Moreover, for example, in a case where the interface section 21 receives, from the personal computer 10, a command to shift the operation mode of the storage device 20 to a low power consumption mode, such as a sleep command, the control section 24 is able to determine that the storage device 20 is not accessed by the personal computer 10.

In addition, for example, the control section 24 confirms consistency of the file system of the storage section 22. In a case where the consistency is present, the control section 24 is able to determine that the storage device 20 is not being accessed for writing by the personal computer 10. More specifically, for example, in a case where the FAT table information FAT1 and FAT2 and the directory entry information DE have no contradiction, the control section 24 is able to determine that consistency is present. Moreover, for example, in a case where write access is performed on a sector that is marked with used in the FAT table information FAT1 and FAT2, the control section 24 is able to determine that no consistency is present.

Further, for example, in a case where a dirty flag indicating that the data is under rewriting is included in the file system, the control section 24 is able to determine that the storage device 20 is not being accessed for writing by the personal computer 10, in a case where the dirty flag has been reset.

In a case where access is ongoing in step S44 ("H" in step S44), the flow is terminated. In other words, since the flow proceeds in order of steps S41, S43, and S44 in this case, the mobile phone 30 is not located near the storage device 20 ("N" in step S41) but the personal computer 10 is still performing the write access or the read access on the storage device 20 ("Y" in step S44). Therefore, the control section 24 maintains the operation mode in the access permission mode M1.

In addition, in a case where access is not ongoing in step S44 ("N" in step S44), the control section 24 sets the operation mode to the access restriction mode M2. In other words, since the flow proceeds in order of steps S41, S43, and S44 in this case, the mobile phone 30 is not located near the storage device 20 ("N" in step S41) and the personal computer 10 is not accessing the storage device 20 ("N" in step S44). Therefore, the control section 24 sets the operation mode to the access restriction mode M2. The flow is then terminated.

FIG. 8 illustrates a state transition diagram of the storage device 20. The storage device 20 first operates in the access restriction mode M2 after activation. In the case where the operation mode is the access restriction mode M2, the operation mode is shifted to the access permission mode M1 in the case where the distance D between the storage device 20 and the mobile phone 30 is equal to or smaller than the predetermined distance D1. In addition, in the case where the operation mode is the access permission mode M1, the operation mode is shifted to the access restriction mode M2 in the case where the distance D between the storage device 20 and the mobile phone 30 is larger than the predetermined distance D1 and access is not ongoing.

As described above, since the storage device 20 itself that stores the confidential data sets the operation mode in the access control system 1, it is possible to suppress introduction cost. In other words, for example, in a case of the configuration in which the personal computer 10 sets the operation mode, it is necessary for not only the personal computer 10 but also all of personal computers in which the storage device storing the confidential data may be possibly used, to have such a function of setting the operation mode. Further, it is necessary to configure the storage device storing the confidential data such that the storage device is prevented from being written and read by the personal computer other than the personal computer having such a function. Therefore, introduction of such a system may possibly take large cost. In contrast, since the storage device 20 itself sets the operation mode in the access control system 1, for example, a personal computer generally used is usable as it is as the personal computer 10, which makes it possible to suppress the introduction cost. As a result, it is possible to enhance convenience of a user.

In addition, in the access control system 1, the operation mode is set to the access permission mode M1 in the case where the distance D between the storage device 20 and the mobile phone 30 is small. Therefore, for example, in a case where the storage device 20 storing the confidential data is stolen, the distance D is increased to cause the operation mode to be changed to the access restriction mode M2. This makes it possible to reduce possibility that the confidential information is viewed by other person. On the other hand, it is possible for the regular user owning the mobile phone 30 to change the operation mode of the storage device 20 to the access permission mode M1 only by approaching the storage device 20. As a result, for example, the access setting is able to be performed without using a password. In this case, input of the password is unnecessary for the user, which makes it possible to enhance convenience.

Further, the operation mode is not shifted to the access restriction mode M2 in the access control system 1 in the case where the access is ongoing even if the distance D is large. This makes it possible to reduce possibility of defect occurrence. In other words, for example, in the case where the operation mode is shifted from the access permission mode M1 to the access restriction mode M2 during the write access (the write access period P1) or the read access (the read access period P2), a defect may possibly occur. More specifically, in the case where the operation mode is shifted to the access restriction mode M2 in the middle of data writing to the storage section 22 of the storage device 20 (for example, at timing t1 illustrated in FIG. 5) or in the middle of waiting of the next write command (for example, at timing t2 illustrated in FIG. 5), the processing in the personal computer 10 may be possibly stopped on the way, and data is broken because a portion of the data is not written. In addition, in the case where the operation mode is shifted to the access restriction mode M2 in the middle of data reading from the storage section 22 (for example, at timing t3 illustrated in FIG. 6) or in the middle of waiting of the next read command (for example, at timing t4 illustrated in FIG. 6), the processing in the personal computer 10 may be possibly stopped on the way because a portion of the data is not read out. In contrast, in the access control system 1, the storage device 20 does not shift the operation mode to the access restriction mode M2 in the case where the access is ongoing even if the distance D is large. This makes it possible to reduce possibility of occurrence of such a defect. As a result, it is possible to enhance convenience of a user.

In addition, the access control system 1 determines whether the access is ongoing, with use of, for example, the confirmation command CONF and the command to shift the operation mode to the low power consumption mode. This makes it possible to enhance accuracy of determination of whether the access is ongoing. In other words, the control section 24 easily determines that the access is ongoing, for example, in the period in which the data is being written into the storage section 22 of the storage device 20 (for example, the period including the timing t1 illustrated in FIG. 5); however, it is difficult for the control section 24 to determine that the access is ongoing in the period of waiting the next write command (for example, the period including the timing t2 illustrated in FIG. 5). This is because a controller of the write access is the personal computer 10 and the control section 24 does not grasp all of the data to be written. The same applies to the read access. Therefore, the access control system 1 determines whether the access is ongoing, with use of, for example, the confirmation command CONF and the command to shift the operation mode to the low power consumption mode. As a result, for example, the control section 24 determines that the access is ongoing not only in the period in which the data is written into the storage section 22 but also in the period of waiting the next write command. This makes it possible to enhance accuracy of determination of whether the access is ongoing, in the access control system 1.

[Effects]

As described above, in the present embodiment, since the storage device itself sets the operation mode, it is possible to suppress introduction cost, and to accordingly enhance convenience of a user.

In the present embodiment, the operation mode is set to the access permission mode in the case where the distance between the storage device and the mobile phone is small. This makes it possible to reduce possibility that confidential information is viewed by other person and to enhance convenience of a user as well.

In the present embodiment, the operation mode is not shifted to the access restriction mode in the case where the access is ongoing even if the distance between the storage device and the mobile phone is large. This makes it possible to reduce possibility of defect occurrence and to accordingly enhance convenience of a user.

In the present embodiment, since it is determined whether the access is ongoing, with use of the confirmation command, the command to shift the operation mode to the low power consumption mode, or other command, it is possible to enhance accuracy of determination of whether the access is ongoing.

Modification Example 1

In the above-described embodiment, the distance D is determined, on the basis of the reception signal intensity RSSI in step S41 of FIG. 7. At this time, for example, the distance D may be determined with use of, in addition to the latest reception signal intensity RSSI, the reception signal intensity RSSI acquired in past as well. More specifically, it is possible to determine the distance D, on the basis of, for example, an average value of a plurality of recent values among a plurality of measurement values of the reception signal intensity RSSI. In addition, for example, in a case where the distance D is larger than the predetermined distance D a plurality of successive times in step S41 of FIG. 7, the process may proceed to step S43. This makes it possible to determine more accurate distance D, for example, even in a case where an obstruction is present at a near site or even in a case where a noise source is present at a near site.

Modification Example 2

In the above-described embodiment, the control section 24 performs the access setting on both of the read access and the write access; however, the configuration is not limited thereto. For example, the access setting may be performed on only one of the read access and the write access.

Modification Example 3

In the above-described embodiment, the control section 24 performs the access setting on the entire address region of the storage section 22; however, the configuration is not limited thereto. For example, the storage section 22 is divided into a plurality of partitions (in this example, two partitions PR1 and PR2), and the access setting may be performed on each of the partitions. More specifically, for example, as illustrated in FIG. 9, different access setting from each other may be performed on the partitions PR1 and PR2. In this example, the access setting is performed such that the partition PR2 is referred to in the access permission mode M1 and the partition PR1 is referred to in the access restriction mode M2. In this case, the confidential information is stored in the partition PR2. Further, for example, as illustrated in FIG. 10, the access setting may be performed on only one of the partitions PR1 and PR2. In this example, the access setting is performed only on the partition PR2. As a result, the partitions PR1 and PR2 are both referred to in the access permission mode M1, whereas only the partition PR1 is referred to in the access restriction mode M2. In this case, the confidential information is stored in the partition PR2.

Modification Example 4

In the above-described embodiment, the access control system 1 is configured with use of the storage device 20 that stores the data by itself; however, the configuration is not limited thereto. Alternatively, for example, as with an access control system 2 illustrated in FIG. 11, an access control system may be configured with use of a memory card and a reader writer. The access control system 2 includes a memory card 50 and a reader writer 40, The memory card 50 stores data. The reader writer 40 writes data into the memory card 50 or reads data from the memory card 50. The reader writer 40 includes a memory card control section 42. The memory card control section 42 controls, on the basis of the write instruction from the control section 24, the memory card 50 to write data that is supplied from the personal computer 10 through the interface section 21, into the memory card 50. In addition, the memory card control section 42 reads data from the memory card 50, on the basis of the read instruction from the control section 24, and supplies the read data to the personal computer 10 through the interface section 21. Here, the control section 24 and the memory card control section 42 correspond to a specific example of a "control section" in the disclosure.

Modification Example 5

In the above-described embodiment, the access control system 1 is configured with use of one mobile phone 30; however, the number of mobile phones is not limited thereto. Alternatively, for example, as with an access control system 3 illustrated in FIG. 12, an access control system may be configured with use of a plurality of (three in this example) mobile phones. The access control system 3 includes a storage device 60 and mobile phones 30A, 30B, and 30C. The storage device 60 is configured to be able to perform the wireless communication WC with each of the mobile phones 30A, 30B, and 30C. As illustrated in FIG. 2, the storage device 60 includes a control section 64. The control section 64 controls an operation of each block in the storage device 60, and performs access setting with respect to access from the personal computer 10. More specifically, the control section 64 determines the number NM of mobile phones that are located within the predetermined distance D1 of the mobile phones 30A to 30C, and performs the access setting on the basis of the number NM.

FIG. 13 illustrates a sequence diagram of an operation in the access control system 3.

When the storage device 60 is coupled to the personal computer 10 and receives power, the storage device 60 first sets the operation mode to the access restriction mode M2.

Next, the mobile phone 30A transmits a beacon signal through the wireless communication WC, and the storage device 60 receives the beacon signal (step S51). The storage device 60 then performs authentication processing on the mobile phone 30A (step S52), and measures a distance DA between the storage device 60 and the mobile phone 30A (step S53). The storage device 60 then performs the access setting (step S54).

Thereafter, likewise, the storage device 60 receives a beacon signal transmitted from the mobile phone 30B (step S55), performs the authentication processing on the mobile phone 30B (step S56), measures a distance DB between the storage device 60 and the mobile phone 30B (step S57), and performs the access setting (step S58). Thereafter, likewise, the storage device 60 receives a beacon signal transmitted from the mobile phone 30C (step S59), performs the authentication processing on the mobile phone 30C (step S60), measures a distance DC between the storage device 60 and the mobile phone 30C (step S61), and performs the access setting (step S62).

Thereafter, the storage device 60 periodically measures the distances DA, DB, and DC between the storage device 60 and the respective mobile phones 30A, 30B, and 30C (for example, steps S65, S66, and S67), in a manner similar to the operations in steps S53, S57, and S61, and performs the access setting (for example, step S68), in a manner similar to the operations in steps S54, S58, and S62.

On the other hand, the personal computer 10 periodically transmits, to the storage device 60, the confirmation command CONF for confirmation of the state of the storage device 60 (step S63). The storage device 60 then responses the confirmation command CONF, thereby informing the personal computer 10 of whether the operation mode is the access permission mode M1 or the access restriction mode M2 (step S64).

FIG. 14 illustrates a flowchart of the access setting in the storage device 60.

The control section 64 of the storage device 60 first determines the number NM of mobile phones having a distance that is equal to or smaller than the predetermined distance D1 of the authenticated mobile phones (step S71).

Next, the control section 64 confirms whether the number NM determined in step S71 is equal to or larger than a predetermined number NM1 (NM≥NM1) (step S72). In a case where the number NM is equal to or larger than the predetermined number NM1 ("Y" in step S72), the control section 64 sets the operation mode to the access permission mode M1 (step S42), as with the above-described embodiment. More specifically, for example, in a case where the number NM1 is set to "2", the control section 64 sets the operation mode to the access permission mode M1 if two or more of the three mobile phones 30A to 30 are located near the storage device 60. The flow is then terminated.

In a case where the number NM is smaller than the predetermined number NM1 in step S72 ("N" in step S72), the control section 64 confirms whether the storage device 60 is being accessed by the personal computer 10 (steps S43 and S44), as with the case of the above-described embodiment. In a case where the access is ongoing in step S44 ("Y" in step S44), the flow is terminated. In contrast, in a case where the access is not ongoing in step S44 ("N" in step S44), the control section 64 sets the operation mode to the access restriction mode M2, as with the case of the above-described embodiment. The flow is then terminated.

In the above-descried example, the control section 64 determines the number NM of mobile phones having the distance that is equal to or smaller than the predetermined distance D1 of the mobile phones 30A to 30C, and performs the access setting, on the basis of the number NM; however, the configuration is not limited thereto. Alternatively, for example, weight coefficients PA to PC may be respectively set to the mobile phones 30A to 30C in advance, the weight coefficients of the mobile phones having the distance that is equal to or smaller than the predetermined distance D1 of the mobile phones 30A to 30C may be added to determine a parameter PM, and the access setting may be performed, on the basis of the parameter PM. A storage device 60A according to the present modification example is described in detail below.

FIG. 15 illustrates a flowchart of access setting in the storage device 60A.

A control section 64A of the storage device 60A first adds the weight coefficients of the mobile phones having the distance that is equal to or smaller than the predetermined distance D1 of the authenticated mobile phones, thereby determining the parameter PM (step S73).

Next, the control section 64A confirms whether the parameter PM determined in step S73 is equal to or larger than a predetermined number PM1 (PM≥PM1) (step S72). In a case where the parameter PM is equal to or larger than the predetermined number PM1 ("Y" in step S74), the control section 64A sets the operation mode to the access permission mode M1 (step S42), as with the above-described embodiment. More specifically, for example, in a case where the weight coefficient PA of the mobile phone 30A is set to "1" (PA=1), the weight coefficient PB of the mobile phone 309 is set to "2" (PB=2), the weight coefficient PC of the mobile phone 30C is set to "1" (PC=1), and the predetermined number PM1 is set to "3", the control section 64A sets the operation mode to the access permission mode M1 if the mobile phone 30B and one of the mobile phones 30A and 30C are located near the mobile phone 60A. In other words, when the mobile phones 30A and 30C are located near the storage device 60A but the mobile phone 30B is not located near the storage device 60A, the control section 64A does not set the operation mode to the access permission mode M1. The flow is then terminated.

In a case where the parameter PM is smaller than the predetermined number PM1 in step S74 ("N" in step S74), the control section 64A confirms whether the storage device 60A is being accessed by the personal computer 10 (steps S43 and S44), as with the above-described embodiment. In a case where the access is ongoing in step S44 ("Y" in step S44), the flow is terminated. In contrast, in a case where the access is not ongoing in step S44 ("N" in step S44), the control section 64A sets the operation mode to the access restriction mode M2, as with the case of the above-described embodiment. The flow is then terminated.

Modification Example 6

For example, the mobile phone 30 may be configured to be able to set whether to transmit a beacon signal through communication from a remote place. In addition, for example, the mobile phone 30 may be configured to be able to set whether to perform authentication with the storage device 20 through communication from a remote place. More specifically, the mobile phone 30 is able to be configured such that these settings are able to be performed by other personal computer through a wireless LAN, etc. This makes it possible to restrict access to the storage device 20, for example, in a case where both of the storage device 20 and the mobile phone 30 are lost at the same time, which allows for reduction in possibility that confidential information is known by other person.

Other Modification Examples

Moreover, two or more of these modification examples may be combined.

Hereinbefore, although the technology has been described with referring to the embodiment and the modification examples, the technology is not limited the embodiment, etc., and various modifications may be made.

For example, in the above-described embodiment, the storage device 20 performs the wireless communication WC with the mobile phone 30; however, the configuration is not limited thereto. Alternatively, for example, as with an access control system 4 illustrated in FIG. 16, the storage device 20 may perform the wireless communication WC with a stationary apparatus (in this example, an access point 70 of wireless LAN). In this case, the personal computer 10 is able to access the storage device 20 in a case where the personal computer 10 is located within a predetermined fixed range including the access point 70.

Note that the effects described in the present specification are illustrative and non-restricting. Further, effects other than those described above may be provided.

Note that the technology may have the following configuration.

(1) A storage device including:
   a storage section that stores data;
   a communication section that performs wireless communication with one or a plurality of electronic apparatuses;

an interface section that performs exchange of the data with a host apparatus; and a control section that determines a distance to each of the electronic apparatuses through the wireless communication, and controls access to the storage section by the host apparatus, on the basis of the distance and whether the host apparatus is accessing the storage section.

(2) The storage device according to (1), in which the communication section performs the wireless communication with the one electronic apparatus;

the control section includes a plurality of operation modes including an access permission mode and an access restriction mode, in a case where the operation mode is the access restriction mode, the control section sets the operation mode to the access permission mode in a case where the distance is equal to or smaller than a predetermined distance, and in a case where the operation mode is the access permission mode, the control section sets the operation mode to the access restriction mode in a case where the distance is larger than the predetermined distance and the host apparatus is not accessing the storage section.

(3) The storage device according to (2), in which the communication section performs the wireless communication with the plurality of electronic apparatuses, the control section includes a plurality of operation modes including an access permission ode and an access restriction mode, in a case where the operation mode is the access restriction mode, the control section sets the operation mode to the access permission mode in a case where an apparatus number of electronic apparatuses having the distance that is equal to or smaller than a predetermined distance among the plurality of electronic apparatuses is equal to or larger than a predetermined number, and in a case where the operation mode is the access permission mode, the control section sets the operation mode to the access restriction mode in a case where the apparatus number is smaller than the predetermined number and the host apparatus is not accessing the storage section.

(4) The storage device according to (3), in which the communication section performs the wireless communication with the plurality of electronic apparatuses, a weight coefficient is set for each of the electronic apparatuses, the control section includes a plurality of operation modes including an access permission mode and an access restriction mode, in a case where the operation mode is the access restriction mode, the control section sets the operation mode to the access permission mode in a case where a coefficient sum of the weight coefficients of the electronic apparatuses having the distance that is equal to or smaller than a predetermined distance among the plurality of electronic apparatuses is equal to or larger than a predetermined value, and in a case where the operation mode is the access permission mode, the control section sets the operation mode to the access restriction mode in a case where the coefficient sum is smaller than the predetermined value and the host apparatus is not accessing the storage section.

(5) The storage device according to any one of (1) to (4), in which each of the electronic apparatuses transmits a beacon, the communication section receives the beacon, and the control section authenticates the electronic apparatus that has transmitted the beacon, and thereafter determines the distance to the authenticated electronic apparatus.

(6) The storage device according to any one of (1) to (5), in which the host apparatus transmits a control command to the interface section in a period in which the host apparatus is not accessing the storage section, and the control section determines that the host apparatus is not accessing the storage section, on the basis of the control command.

(7) The storage device according to (6), in which the host apparatus intermittently transmits the control command, and the control section determines that the host apparatus is not accessing the storage section, on the basis of number of reception times of the control command.

(8) The storage device according to (6), in which the control section includes a plurality of operation modes including a low power consumption mode, and the control command is a command causing the operation mode to be set to the low power consumption mode.

(9) The storage device according to any one of (1) to (8), in which the control section confirms consistency of a file system of the storage section, and determines that the host apparatus is not accessing the storage section in a case where the consistency is provided.

(10) The storage device according to any one of (1) to (9), in which a file system of the storage section includes a flag that indicates whether data is under rewriting, and the control section determines that the host apparatus is not accessing the storage section in a case where the flag is reset.

(11) The storage device according to any one of (1) to (10), in which the control section determines the distance, on the basis of reception intensity in the communication section.

(12) The storage device according to any one of (1) to (11), in which the host apparatus reads or writes data with a predetermined data amount as a unit, to perform the access.

(13) The storage device according to any one of (1) to (12), in which the interface section is directly coupled to the host apparatus.

(14) The storage device according to any one of (1) to (12), in which the interface section is wirelessly coupled to the host apparatus.

(15) A reader writer including:

a communication section that performs wireless communication with one or a plurality of electronic apparatuses;

an interface section that performs exchange of data with a host apparatus; and a control section that determines a distance to each of the electronic apparatuses through the wireless communication, and controls access to a storage section by the host apparatus, on the basis of the distance and whether the host apparatus is accessing the storage section, the storage section storing the data.

(16) An access control system including:

one or a plurality of electronic apparatuses;

a host apparatus; and a storage device, in which the storage device includes a storage section that stores data, a communication section that performs wireless communication with the one or the plurality of electronic apparatuses, an interface section that performs exchange of the data with the host apparatus, and a control section that determines a distance to each of the electronic apparatuses through the wireless communication, and controls access to the storage section by the host apparatus, on the basis of the distance and whether the host apparatus is accessing the storage section.

(17) The access control system according to (16), in which each of the electronic apparatuses transmits a beacon, the communication section receives the beacon, the control section authenticates the electronic apparatus that has transmitted the beacon, and thereafter determines the distance to the authenticated electronic apparatus, and the electronic apparatus is configured to be able to perform communication with other electronic apparatus to thereby stop the transmission of the beacon.

(18) The access control system according to (16) or (17), in which each of the electronic apparatuses transmits a beacon, the communication section receives the beacon, the control section authenticates the electronic apparatus that has transmitted the beacon, and thereafter determines the distance to the authenticated electronic apparatus, and the electronic apparatus is configured to be able to perform communication with other electronic apparatus to thereby prevent the electronic apparatus that has transmitted the beacon from being authenticated.

(19) An access control method including:

performing wireless communication with one or a plurality of electronic apparatuses to thereby determine a distance to each of the electronic apparatuses; and controlling access to a storage section by a host apparatus, on the basis of the distance and whether the host apparatus is accessing the storage section.

This application is based upon and claims the benefit of priority of the Japanese Patent Application No. 2015-100778 filed with the Japan Patent Office on May 18, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A storage device comprising:
a storage circuitry that stores data;
a communication circuitry that performs wireless communication with one or more of a plurality of electronic apparatuses;
an interface circuitry that performs exchange of the data with a host apparatus; and
a control circuitry that determines a distance from the storage device to each of the one or more of the plurality of electronic apparatuses through the wireless communication, and controls access to the storage circuitry by the host apparatus on a basis of one or more distances that are determined and whether the host apparatus is accessing the storage circuitry, wherein the control circuitry includes an access permission mode and an access restriction mode, the control circuitry sets an operation mode to the access permission mode in a case where a number of the one or more of the plurality of electronic apparatuses is equal to or larger than a predetermined number, and the number being associated with the one or more of the plurality of electronic apparatuses having a respective distance from the one or more distances that is equal to or smaller than a predetermined distance, and the control circuitry sets the operation mode to the access restriction mode in a case where the number is smaller than the predetermined number and the host apparatus is not accessing the storage circuitry.

2. The storage device according to claim 1, wherein each of the one or more of the plurality of electronic apparatuses transmits a beacon, the communication circuitry receives one or more beacons from the one or more of the plurality of electronic apparatuses, and the control circuitry authenticates the each of the one or more of the plurality of electronic apparatuses that individually transmitted the beacon, and thereafter determines the one or more distances to the one or more of the plurality of electronic apparatuses.

3. The storage device according to claim 1, wherein the host apparatus transmits a control command to the interface circuitry in a period in which the host apparatus is not accessing the storage circuitry, and the control circuitry determines that the host apparatus is not accessing the storage circuitry, on a basis of the control command.

4. The storage device according to claim 3, wherein the host apparatus intermittently transmits the control command, and the control circuitry determines that the host apparatus is not accessing the storage circuitry, on a basis of number of reception times of the control command.

5. The storage device according to claim 3, wherein the control circuitry further includes a low power consumption mode, and the control command is a command that causes the control circuitry to set the operation mode to the low power consumption mode.

6. The storage device according to claim 1, wherein the control circuitry confirms consistency of a file system of the storage circuitry, and determines that the host apparatus is not accessing the storage circuitry in a case where the consistency is confirmed.

7. The storage device according to claim 1, wherein a file system of the storage circuitry includes a flag that indicates whether the data is under rewriting, and the control circuitry determines that the host apparatus is not accessing the storage circuitry in a case where the flag is reset.

8. The storage device according to claim 1, wherein the control circuitry determines the one or more distances, on a basis of reception intensity in the communication circuitry.

9. The storage device according to claim 1, wherein the host apparatus reads or writes additional data to or from the storage circuitry with a predetermined data amount as a unit, to perform the access to the storage circuitry.

10. The storage device according to claim 1, wherein the interface circuitry is directly coupled to the host apparatus.

11. The storage device according to claim 1, wherein the interface circuitry is wirelessly coupled to the host apparatus.

12. A storage device comprising:
a storage circuitry that stores data;
a communication circuitry that performs wireless communication with one or more of a plurality of electronic apparatuses;
an interface circuitry that performs exchange of the data with a host apparatus; and
a control circuitry that determines a distance from the storage device to each of the one or more of the plurality of electronic apparatuses through the wireless communication, and controls access to the storage circuitry by the host apparatus on a basis of one or more distances that are determined and whether the host apparatus is accessing the storage, wherein
a weight coefficient is set for each of the one or more of the plurality of electronic apparatuses,
the control circuitry includes an access permission mode and an access restriction mode,
the control circuitry sets an operation mode to the access permission mode in a case where a sum of one or more weight coefficients is equal to or larger than a predetermined value, the one or more weight coefficients being associated with the one or more of the plurality of electronic apparatuses having a respective distance from the one or more distances that is equal to or smaller than a predetermined distance, and
the control circuitry sets the operation mode to the access restriction mode in a case where the sum of the one or more weight coefficients is smaller than the predetermined value and the host apparatus is not accessing the storage circuitry.

13. The storage device according to claim 12, wherein
the host apparatus transmits a control command to the interface circuitry in a period in which the host apparatus is not accessing the storage circuitry, and
the control circuitry determines that the host apparatus is not accessing the storage circuitry, on a basis of the control command.

14. The storage device according to claim 13, wherein
the host apparatus intermittently transmits the control command, and
the control circuitry determines that the host apparatus is not accessing the storage circuitry, on a basis of number of reception times of the control command.

15. The storage device according to claim 13, wherein
the control circuitry further includes a low power consumption mode, and
the control command is a command that causes the control circuitry to set the operation mode to the low power consumption mode.

16. A reader writer comprising:
a communication circuitry that performs wireless communication with one or more of a plurality of electronic apparatuses;
an interface circuitry that performs exchange of data with a host apparatus; and
a control circuitry that determines a distance from a storage device to each of the one or more of the plurality of electronic apparatuses through the wireless communication, and controls access to the storage device by the host apparatus on a basis of one or more distances that are determined and whether the host apparatus is accessing the storage device, the storage device storing the data, wherein
the control circuitry includes an access permission mode and an access restriction mode,
the control circuitry sets an operation mode to the access permission mode in a case where a number of the one or more of the plurality of electronic apparatuses is equal to or larger than a predetermined number, and the number being associated with the one or more of the plurality of electronic apparatuses having a respective distance from the one or more distances that is equal to or smaller than a predetermined distance, and
the control circuitry sets the operation mode to the access restriction mode in a case where the number is smaller than the predetermined number and the host apparatus is not accessing the storage circuitry.

17. An access control system comprising:
one or more electronic apparatuses;
a host apparatus; and
a storage device, wherein the storage device includes
a storage circuitry that stores data,
a communication circuitry that performs wireless communication with the one or more electronic apparatuses,
an interface circuitry that performs exchange of the data with the host apparatus, and
a control circuitry that determines a distance from the storage device to each of the one or more electronic apparatuses through the wireless communication, and controls access to the storage circuitry by the host apparatus on a basis of one or more distances that are determined and whether the host apparatus is accessing the storage circuitry, wherein
the control circuitry includes an access permission mode and an access restriction mode,
the control circuitry sets an operation mode to the access permission mode in a case where a number of the one or more of the plurality of electronic apparatuses is equal to or larger than a predetermined number, and the number being associated with the one or more of the plurality of electronic apparatuses having a respective distance from the one or more distances that is equal to or smaller than a predetermined distance, and
the control circuitry sets the operation mode to the access restriction mode in a case where the number is smaller than the predetermined number and the host apparatus is not accessing the storage circuitry.

18. The access control system according to claim 17, wherein
each of the one or more electronic apparatuses transmits a beacon,
the communication circuitry receives one or more beacons from the one or more electronic apparatuses,
the control circuitry authenticates the each of the one or more electronic apparatuses that individually transmitted the beacon, and thereafter determines the distance to the each of the one or more electronic apparatuses, and
the each of the one or more electronic apparatuses are configured to be able to perform communication with a second electronic apparatus to thereby stop a transmission of a second beacon by the each of the one or more electronic apparatuses.

19. The access control system according to claim 17, wherein
each of the one or more electronic apparatuses transmits a beacon,
the communication circuitry receives one or more beacons from the one or more electronic apparatuses,
the control circuitry authenticates the each of the one or more electronic apparatuses that individually transmitted the beacon, and thereafter determines the distance to the each of the one or more electronic apparatuses, and the each of the one or more electronic apparatuses are configured to perform communication with a second electronic apparatus to thereby prevent the each of the one or more electronic apparatuses that individually transmitted the beacon from being authenticated.

20. An access control method comprising:

performing, with a storage device, wireless communication with one or more electronic apparatuses to thereby determine a distance from the storage device to each of the one or more electronic apparatuses; and controlling, with the storage device, access to a storage circuitry of the storage device by a host apparatus on a basis of the one or more distances that are determined and whether the host apparatus is accessing the storage circuitry, wherein controlling access to the storage circuitry of the storage device by the host apparatus on the basis of the one or more distances that are determined and whether the host apparatus is accessing the storage circuitry further includes setting an operation mode of a control circuitry of the storage device to the access permission mode in a case where a number of the one or more of the plurality of electronic apparatuses is equal to or larger than a predetermined number, and the number being associated with the one or more of the plurality of electronic apparatuses having a respective distance from the one or more distances that is equal to or smaller than a predetermined distance, and setting the operation mode of the control circuitry to the access restriction mode in a case where the number is smaller than the predetermined number and the host apparatus is not accessing the storage circuitry.

* * * * *